United States Patent
Nakai et al.

(10) Patent No.: US 12,436,016 B2
(45) Date of Patent: Oct. 7, 2025

(54) RESIDUAL GAS VOLUME MEASURING DEVICE AND RESIDUAL GAS VOLUME MEASURING METHOD

(71) Applicant: KYOTO ELECTRONICS MANUFACTURING CO., LTD., Kyoto (JP)

(72) Inventors: Shuji Nakai, Kyoto (JP); Takashi Matsuki, Kyoto (JP); Nobuaki Watanabe, Kyoto (JP)

(73) Assignee: KYOTO ELECTRONICS MANUFACTURING CO., LTD., Kyoto (JP)

( * ) Notice: Subject to any disclaimer, the term of this patent is extended or adjusted under 35 U.S.C. 154(b) by 317 days.

(21) Appl. No.: 18/043,587

(22) PCT Filed: Aug. 25, 2021

(86) PCT No.: PCT/JP2021/031106
§ 371 (c)(1),
(2) Date: Mar. 1, 2023

(87) PCT Pub. No.: WO2022/059444
PCT Pub. Date: Mar. 24, 2022

(65) Prior Publication Data
US 2023/0358590 A1    Nov. 9, 2023

(30) Foreign Application Priority Data
Sep. 17, 2020   (JP) ................. 2020-156089

(51) Int. Cl.
*G01F 22/02*    (2006.01)
*G01N 7/04*    (2006.01)

(52) U.S. Cl.
CPC .............. *G01F 22/02* (2013.01); *G01N 7/04* (2013.01)

(58) Field of Classification Search
CPC .................................. G01F 22/02; G01N 7/04
(Continued)

(56) References Cited

U.S. PATENT DOCUMENTS

| 4,120,192 A * | 10/1978 | Williamson | G01N 7/04 73/19.1 |
|---|---|---|---|
| 2010/0236320 A1 | 9/2010 | Stehle et al. | |
| 2021/0172783 A1 | 6/2021 | Aoyama et al. | |

FOREIGN PATENT DOCUMENTS

JP    1062406 A    3/1998

OTHER PUBLICATIONS

PCT/JP2021/031106; PCT International Search Report of the International Searching Authority dated Oct. 15, 2021.

* cited by examiner

*Primary Examiner* — Peter J Macchiarolo
*Assistant Examiner* — Rodney T Frank
(74) *Attorney, Agent, or Firm* — Renner, Otto, Boisselle & Sklar, LLP (57) ABSTRACT

A residual gas volume measuring device to accurately measuring volume of residual gas while preventing deterioration in a pump that pressurizes an airtight container. This device includes a second pipe 50 through which an airtight container filled with a basic carbon dioxide absorbing liquid and a second reservoir retaining pressurization water in communication with each other, a section closer to the airtight container filled with the carbon dioxide absorbing liquid, and a section closer to the second reservoir which is filled with the pressurization water; and a pump provided in the section of the second pipe filled with pressurization water. Before residual gas is introduced into the airtight container, the pump sends the pressurization water in the second pipe toward the second reservoir, and after the (Continued)

residual gas is introduced into the airtight container, the pump sends the pressurization water in the second pipe toward the airtight container.

7 Claims, 9 Drawing Sheets

(58) Field of Classification Search
USPC .......................................................... 73/149
See application file for complete search history.

RESIDUAL GAS VOLUME MEASURING DEVICE AND RESIDUAL GAS VOLUME MEASURING METHOD

This application is a national phase of International Application No. PCT/JP2021/031106 filed 25 Aug. 2021, which claims priority to Japan Application No. 2020-156089 filed 17 Sep. 2020, the entire disclosures of which are hereby incorporated by reference.

TECHNICAL FIELD

The present invention relates to residual gas volume measuring devices and residual gas volume measuring methods for measuring the volume of residual gas in a container to be tested.

BACKGROUND ART

In the process of bottling carbonated drink, beer, low-malt beer, or the like, the volume of gases other than carbon dioxide that remain in a container (such gases are hereinafter referred to as "residual gas") is measured as one of the items to be managed.

For example, there is a residual gas volume measuring device that measures the volume of residual gas by introducing the contents in a container to be tested that is filled with carbonated drink, into an airtight container filled with a carbon dioxide absorbent (carbon dioxide absorbing liquid) such as an aqueous sodium hydroxide solution, and thereby removing carbon dioxide (see, for example, Patent Document 1). In the residual gas volume measuring device of Patent Document 1, after the contents in the container to be tested are introduced into the airtight container, the airtight container is pressurized by additionally injecting a carbon dioxide absorbent into the airtight container using a pump. Based on the amount of the injected carbon dioxide absorbent at that time, i.e., a change in the volume of residual gas due to the pressurization, and pressures in the airtight container before and after the pressurization, the volume of residual gas introduced into the container to be tested can be quickly and accurately measured according to Boyle's law.

CITATION LIST

Patent Literature

Patent Document 1: Japanese Unexamined Patent Application Publication No. H10-62406

SUMMARY OF INVENTION

Technical Problem

However, in the residual gas volume measuring device of Patent Document 1, a strong base solution such as an aqueous sodium hydroxide solution is used as the carbon dioxide absorbent. Therefore, the pump that pressurizes the airtight container is exposed to a strong base during operation and is therefore likely to deteriorate. In addition, the long-term use of the pump may lead to deposition of a solute such as sodium hydroxide, which may cause a failure in the pump. The measurement accuracy of the residual gas volume measuring device of Patent Document 1 depends on the accuracy of a change in the volume of residual gas due to the injection of the carbon dioxide absorbent. Therefore, the deterioration in the pump that pressurizes the airtight container may cause a reduction in measurement accuracy. The pump that pressurizes the airtight container is required to be able to finely control a liquid delivery amount in order to attain high measurement accuracy, and therefore, costs high. Therefore, replacement of a deteriorated or disabled pump is a great burden in terms of cost.

With the above problem in mind, the present invention has been made. It is an object of the present invention to provide a residual gas volume measuring device and residual gas volume measuring method that are capable of highly accurately measuring the volume of residual gas while inhibiting a deterioration in a pump that pressurizes an airtight container.

Solution to Problem

A characteristic feature of a residual gas volume measuring device according to the present invention for solving the above problem is a residual gas volume measuring device for measuring the volume of residual gas in a container to be tested, comprising:
  an airtight container that is filled with a basic carbon dioxide absorbing liquid;
  a first reservoir in which the carbon dioxide absorbing liquid is retained;
  a first pipe through which the airtight container and the first reservoir are in communication with each other and that is filled with the carbon dioxide absorbing liquid;
  a valve that is provided in the first pipe;
  a second reservoir in which pressurization water is retained;
  a second pipe through which the airtight container and the second reservoir are in communication with each other, a section closer to the airtight container of which is filled with the carbon dioxide absorbing liquid, and a section closer to the second reservoir of which is filled with the pressurization water; and
  a pump that is provided in the section of the second pipe that is filled with the pressurization water, wherein
  before the residual gas is introduced from the container to be tested into the airtight container, the pump sends a predetermined amount of the pressurization water in the second pipe toward the second reservoir with the valve open, and after the residual gas is introduced from the container to be tested into the airtight container, the pump sends the predetermined amount of the pressurization water in the second pipe toward the airtight container with the valve closed.

The residual gas volume measuring device thus configured is provided with: an airtight container that is filled with a basic carbon dioxide absorbing liquid; a first reservoir in which the carbon dioxide absorbing liquid is retained; a first pipe through which the airtight container and the first reservoir are in communication with each other and that is filled with the carbon dioxide absorbing liquid; a valve that is provided in the first pipe; a second reservoir in which pressurization water is retained; a second pipe through which the airtight container and the second reservoir are in communication with each other, a section closer to the airtight container of which is filled with the carbon dioxide absorbing liquid, and a section closer to the second reservoir of which is filled with the pressurization water; and a pump that is provided in the section of the second pipe that is filled with the pressurization water. Before the residual gas is introduced from the container to be tested into the airtight container, the pump sends the pressurization water in the second pipe toward the second reservoir with the valve open, and after the residual gas is introduced from the container to be tested into the airtight container, the pump sends a predetermined amount of the pressurization water in the second pipe toward the airtight container with the valve closed. Therefore, the airtight container filled with the carbon dioxide absorbing liquid can be pressurized by the pump only sending the pressurization water without being in contact with the carbon dioxide absorbing liquid. As a result, the pump is not exposed to a strong base, and therefore, can be prevented from deteriorating. In addition, the long-term use of the pump does not lead to deposition of a solute of the carbon dioxide absorbing liquid in the pump.

In addition, the section of the second pipe closer to the airtight container is filled with the carbon dioxide absorbing liquid, and therefore, the pressurization water sent toward the airtight container by the pump is not directly injected into the airtight container, and most of the pressurization water remains in the second pipe. Therefore, a change in the partial molar volume of the pressurization water due to mixing with the carbon dioxide absorbing liquid is very small for the liquid delivery amount of the pump. As a result, the volume of the residual gas can be highly accurately measured, based on a change in the volume of residual gas due to pressurization, and pressures in the airtight container before and after pressurization, without a significant influence of a change in partial molar volume caused by mixing of the pressurization water with the carbon dioxide absorbing liquid.

The residual gas volume measuring device according to the present invention preferably further comprises:
 a measuring unit that measures pressure in the airtight container.

After the residual gas is introduced from the container to be tested to the airtight container, the pump preferably sends the pressurization water in the second pipe toward the airtight container until a measured value obtained by the measuring unit reaches a predetermined pressure.

The residual gas volume measuring device thus configured further comprises a measuring unit that measures pressure in the airtight container. After the residual gas is introduced from the container to be tested to the airtight container, the pump sends the pressurization water in the second pipe toward the airtight container until a measured value obtained by the measuring unit reaches a predetermined pressure, whereby the airtight container can be appropriately pressurized. As a result, the volume of the residual gas can be more highly accurately measured, based on a change in the volume of the residual gas due to pressurization and pressures in the airtight container before and after pressurization.

In the residual gas volume measuring device of the present invention,
 a liquid delivery amount of the pressurization water in the second pipe that is sent toward the airtight container by the pump after the residual gas is introduced from the container to be tested into the airtight container is preferably smaller than the capacity of a section of the second pipe between the airtight container and the pump.

In the residual gas volume measuring device thus configured, a liquid delivery amount of the pressurization water in the second pipe that is sent toward the airtight container by the pump after the residual gas is introduced from the container to be tested into the airtight container is smaller than the capacity of a section of the second pipe between the airtight container and the pump, and therefore, the sent pressurization water does not flow into the airtight container. Therefore, the liquid contact area between the pressurization water and the carbon dioxide absorbing liquid can be reduced, so that mixing due to liquid contact occurs in a small region of the second pipe to only a small extent, leading to a further reduction in the change of partial molar volume due to mixing. As a result, the volume of the residual gas can be more highly accurately measured.

In the residual gas volume measuring device of the present invention,
 the capacity of a section of the second pipe between the airtight container and the pump is preferably 1 to 5 mL.

In the residual gas volume measuring device thus configured, the capacity of a section of the second pipe between the airtight container and the pump is 1 to 5 mL. Therefore, in the case in which the capacity of the container to be tested is at most 500 mL, the airtight container can be accurately pressurized by the pump sending the pressurization water without direct injection of the pressurization water into the airtight container.

In the residual gas volume measuring device of the present invention,
 the second pipe is preferably connected to a third pipe at a position between the airtight container and the pump, the third pipe being in communication with the container to be tested, and
 a liquid delivery amount of the pressurization water in the second pipe that is sent toward the airtight container by the pump after the residual gas is introduced from the container to be tested into the airtight container is preferably smaller than the capacity of a section of the second pipe between the pump and the connection position to the third pipe.

In the residual gas volume measuring device thus configured, the second pipe is connected to a third pipe at a position between the airtight container and the pump, the third pipe being in communication with the container to be tested, and a liquid delivery amount of the pressurization water in the second pipe that is sent toward the airtight container by the pump after the residual gas is introduced from the container to be tested into the airtight container is smaller than the capacity of a section of the second pipe between the pump and the connection position to the third pipe, and therefore, the sent pressurization water does not flow into the third pipe. Therefore, the liquid contact area between the pressurization water and the carbon dioxide absorbing liquid can be reduced, so that mixing due to liquid contact occurs in a small region of the second pipe to only a small extent, leading to a further reduction in the change of partial molar volume due to mixing. As a result, the volume of the residual gas can be more highly accurately measured.

In the residual gas volume measuring device of the present invention,
 a liquid delivery amount of the pressurization water in the second pipe that is sent toward the airtight container by the pump after the residual gas is introduced from the container to be tested into the airtight container is preferably controlled such that pressure in the airtight container after the sending of the pressurization water in the second pipe is 130 to 160% of the pressure before the sending of the pressurization water in the second pipe.

In the residual gas volume measuring device thus configured, a liquid delivery amount of the pressurization water in the second pipe that is sent toward the airtight container by the pump after the residual gas is introduced from the container to be tested into the airtight container is controlled such that pressure in the airtight container after the sending of the pressurization water in the second pipe is 130 to 160% of the pressure before the sending of the pressurization water in the second pipe. This control allows the liquid delivery amount of the pressurization water toward the second reservoir to be about one third of the volume of gas introduced into the airtight container. As a result, the airtight container can be appropriately pressurized without direct injection of the pressurization water into the airtight container.

A characteristic feature of a residual gas volume measuring method according to the present invention for solving the above problem is a residual gas volume measuring method for introducing residual gas in a container to be tested into an airtight container filled with a basic carbon dioxide absorbing liquid and measuring the volume of the residual gas, comprising:

an opening step of opening a valve provided in a first pipe through which a first reservoir retaining the carbon dioxide absorbing liquid and the airtight container are in communication with each other and that is filled with the carbon dioxide absorbing liquid;

a preparing step of sending pressurization water retained in a second pipe through which a second reservoir retaining the pressurization water and the airtight container are in communication with each other, a section closer to the airtight container of which is filled with the carbon dioxide absorbing liquid, and a section closer to the second reservoir of which is filled with the pressurization water, toward the second reservoir, using a pump provided in the section of the second pipe that is filled with the pressurization water;

an introducing step of introducing the residual gas from the container to be tested into the airtight container;

a closing step of closing the valve;

a first measuring step of measuring pressure in the airtight container;

a pressurizing step of sending the pressurization water in the second pipe toward the second reservoir using the pump;

a second measuring step of, after the end of the sending of the pressurization water in the second pipe in the pressurizing step, measuring pressure in the airtight container; and a calculating step of calculating the volume of the residual gas, based on the pressure measured in the first measuring step and the pressure measured in the second measuring step.

The residual gas volume measuring method thus configured comprises: a preparing step of sending pressurization water retained in a second pipe through which a second reservoir retaining the pressurization water and the airtight container are in communication with each other, a section closer to the airtight container of which is filled with the carbon dioxide absorbing liquid, and a section closer to the second reservoir of which is filled with the pressurization water, toward the second reservoir, using a pump provided in the section of the second pipe that is filled with the pressurization water; and a pressurizing step of sending the pressurization water in the second pipe toward the second reservoir using the pump. Therefore, the airtight container filled with the carbon dioxide absorbing liquid can be pressurized by the pump only sending the pressurization water without being in contact with the carbon dioxide absorbing liquid. As a result, the pump is not exposed to a strong base, and therefore, can be prevented from deteriorating.

In addition, the section of the second pipe closer to the airtight container is filled with the carbon dioxide absorbing liquid, and therefore, the pressurization water sent toward the airtight container by the pump is not directly injected into the airtight container, and most of the pressurization water remains in the second pipe. Therefore, a change in the partial molar volume of the pressurization water due to mixing with the carbon dioxide absorbing liquid is very small for the liquid delivery amount of the pump. As a result, the volume of the residual gas can be highly accurately measured, based on a change in the volume of residual gas due to pressurization, and pressures in the airtight container before and after pressurization, without a significant influence of a change in partial molar volume caused by mixing of the pressurization water with the carbon dioxide absorbing liquid.

DESCRIPTION OF EMBODIMENTS

A residual gas volume measuring device and residual gas volume measuring method according to the present invention will be described below. It should be noted that the present invention is not intended to be limited to embodiments described below or configurations illustrated in the accompanying drawings.

<Residual Gas Volume Measuring Device>

Figure 1:
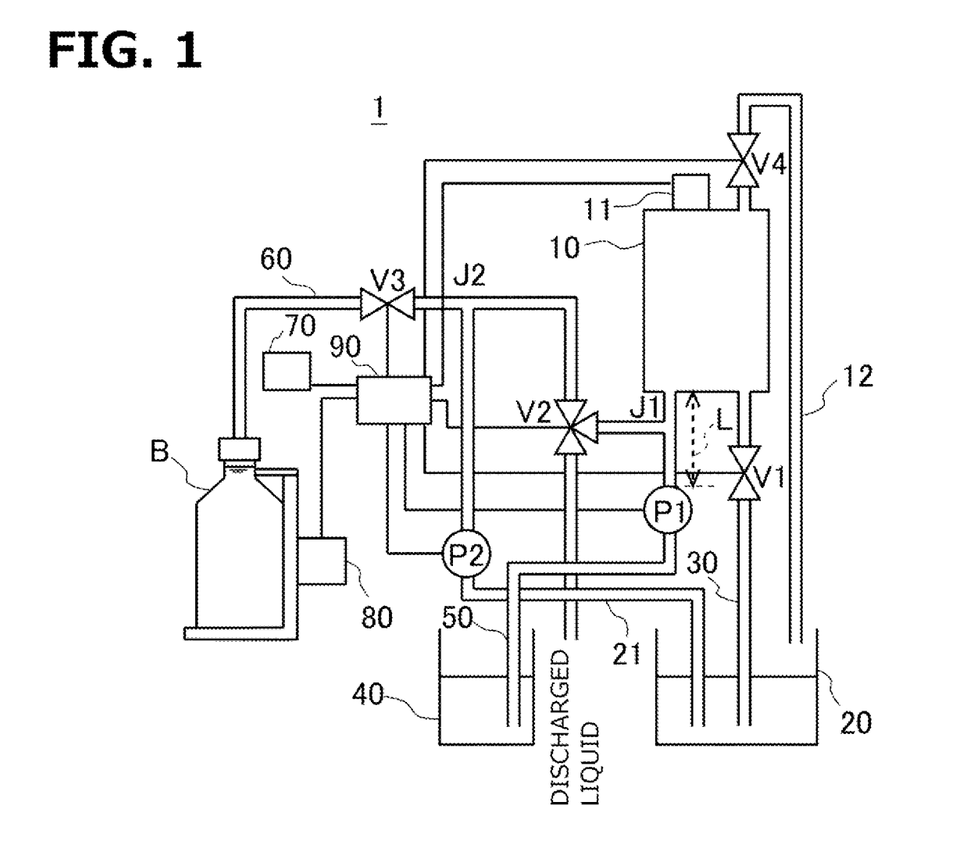
FIG. 1 is a diagram illustrating a configuration of a residual gas volume measuring device according to the present invention.

FIG. 1 is a diagram illustrating a configuration of a residual gas volume measuring device 1 according to the present invention. The residual gas volume measuring device 1 is directed to testing of a container B to be tested that is filled with carbonated drink, beer, low-malt beer, or the like, which is pressurized with carbon dioxide, and is used to measure the volume of residual gas remaining in the container B to be tested. The residual gas volume measuring device 1 comprises an airtight container 10, a first reservoir 20, a first pipe 30, a second reservoir 40, a second pipe 50, a third pipe 60, a calculating unit 70, a pump P1, and a valve V1, and optionally a vibrating unit 80. The operation of the entire residual gas volume measuring device 1 is controlled by a controlling unit 90 that is a computer having a CPU, a memory, a storage, and the like, controlling opening/closing of valves and driving/stopping of pumps.

The airtight container 10, into which residual gas is introduced from the container B to be tested in measurement of the volume of the residual gas, is filled with a carbon dioxide absorbing liquid that is an aqueous basic solution of sodium hydroxide, calcium hydroxide, and potassium hydroxide, or the like before the introduction of the residual gas. In the case in which an aqueous sodium hydroxide solution is used as the carbon dioxide absorbing liquid, the sodium hydroxide concentration of the carbon dioxide absorbing liquid in the airtight container 10 is preferably maintained in the range of 6 to 8 M/L in order to attain quick absorption of carbon dioxide. The capacity of the airtight container 10 is preferably at least 200 mL. If the capacity of the airtight container 10 is in the above range, the volume of residual gas in the container B to be tested having a capacity of 500 mL can be highly accurately measured. In the case in which the capacity of the airtight container 10 is less than 200 mL, the accuracy of measurement of the volume of residual gas in the container B to be tested having a capacity of 500 mL is likely to decrease. The airtight container 10 is provided with a measuring unit 11 such as a pressure gauge that measures pressure in the container at an upper end portion of the container, and an air draining pipe 12 that extends out from the upper end portion of the container and is in communication with the atmosphere. The air draining pipe 12 is provided with an air draining valve V4.

The first reservoir 20 is a tank that retains a carbon dioxide absorbing liquid. The carbon dioxide absorbing liquid retained in the first reservoir 20 is supplied to the airtight container 10 through a charging pipe 21 and a pump P2 provided to the charging pipe 21. The charging pipe 21 is connected to the third pipe 60 as described below.

The first pipe 30, which extends out from a lower end portion of the airtight container 10, is in communication with the first reservoir 20, and is provided with the valve V1. In measurement of the volume of residual gas, the first pipe 30 is filled with the carbon dioxide absorbing liquid.

The second reservoir 40 is a tank that retains water such as tap water or distilled water for pressurization (pressurization water).

The second pipe 50, which extends out from the lower end portion of the airtight container 10, is in communication with the second reservoir 40. In measurement of the volume of residual gas, a section closer to the airtight container 10 of the second pipe 50 is filled with the carbon dioxide absorbing liquid, while a section closer to the second reservoir 40 of the second pipe 50 is filled with the pressurization water. In the section of the second pipe 50 that is filled with the pressurization water in measurement, the pump P1 is provided in order to pressurize the airtight container 10 after the contents of the container B to be tested are introduced into the airtight container 10 in measurement of the volume of residual gas. In the second pipe 50, a section L between the airtight container 10 and the pump P1 serves as a buffering pipe that inhibits the pressurization water that is sent by the pump P1 in order to pressurize the airtight container 10 from flowing into the airtight container 10. Here, in order to measure the volume of residual gas with high accuracy, the pump P1 preferably sends, toward the airtight container 10, the pressurization water in an amount that is about one third of the volume of residual gas introduced into the airtight container 10. The volume of residual gas in the container B to be tested that is filled with carbonated drink or the like is limited by the capacity of the container B to be tested, to some extent. The capacity of the section L is set so as to allow the section L to serve as a buffering pipe, depending on the capacity of the container B to be tested. For example, in the case in which the capacity of the container B to be tested is 500 mL, the capacity of the section L is preferably 1 to 5 mL. If the capacity of the section L is in the above range, the pressurization water sent by the pump P1 can be prevented from flowing into the airtight container 10, and the volume of residual gas introduced from the container B to be tested having a capacity of 500 mL into the airtight container 10 can be highly accurately measured. In the case in which the volume of residual gas is measured for the container B to be tested that has a large capacity, the liquid delivery amount of the pump P1 is also large, and therefore, if the capacity of the section L is in the range of 1 to 5 mL, the pressurization water sent by the pump P1 may also flow into the airtight container 10. Even in that case, when the volume of residual gas is, for example, about 20 mL, then if the capacity of the section L is in the above range, the amount of the pressurization water flowing into the airtight container 10 is only a portion of the liquid delivery amount of the pump P1. As a result, a change in the partial molar volume of the pressurization water is very small for the liquid delivery amount of the pump P1, i.e., a change in the volume of residual gas due to pressurization. Therefore, the volume of residual gas can be measured with practical accuracy. Specifically, in the case in which the capacity of the section L is at least 1 mL, the amount of the pressurization water flowing into the airtight container 10 can be prevented from being relatively large in measurement of the volume of residual gas introduced from the container B to be tested having a capacity of 500 mL into the airtight container 10. As a result, the accuracy of measurement of the volume of residual gas can be prevented from decreasing due to an influence of a change in the partial molar volume of the pressurization water flowing into the airtight container 10. In the case in which the capacity of the section L is at most 5 mL, the size of the device can be prevented from being excessively large. The section L preferably has an inner diameter of 1 to 3 mm. If the inner diameter of the section L is in the above range, the area of contact between the carbon dioxide absorbing liquid and the pressurization water in the section L is reduced, and therefore, a change in the partial molar volume due to mixing of the carbon dioxide absorbing liquid and the pressurization water is further reduced. Specifically, in the case in which the inner diameter of the section L is at least 1 mm, the pipe length of the section L can be prevented from being excessively long in order to obtain an appropriate capacity that allows the section L to serve as a buffering pipe. In the case in which the inner diameter of the section L is at most 3 mm, the area of contact between the carbon dioxide absorbing liquid and the pressurization water can be prevented from being large. As a result, an influence of a change in the partial molar volume due to mixing of the carbon dioxide absorbing liquid and the pressurization water can be prevented from being significant, and therefore, the accuracy of measurement of the volume of residual gas can be prevented from being reduced.

The accuracy of measurement of the volume of residual gas by the residual gas volume measuring device 1 depends on the accuracy of the liquid delivery amount of the pump P1. Therefore, the pump P1 is required to be able to highly accurately adjust the liquid delivery amount. For example, the pump P1 may be a Hi-Cera pump (manufactured by Iwaki Co., Ltd.). The pump P1, which can send liquid bidirectionally, sends the pressurization water in the second pipe 50 toward the second reservoir 40 before residual gas is introduced from the container B to be tested into the airtight container 10, thereby allowing the section L to serve as a buffering pipe, in measurement of the volume of residual gas in the residual gas volume measuring device 1. Meanwhile, the pump P1 sends the pressurization water in the second pipe 50 toward the airtight container 10 to pressurize the airtight container 10 after residual gas is introduced from the container B to be tested into the airtight container 10. No matter in which direction the pump 1 sends liquid, the pump P1 sends the pressurization water and is not brought into contact with the carbon dioxide absorbing liquid. Therefore, the pump P1 is not exposed to a strong base during operation, and therefore, can be prevented from deteriorating. In addition, the long-term use of the pump P1 does not lead to deposition of a solute of the carbon dioxide absorbing liquid. The liquid delivery amount of the pressurization water sent toward the airtight container 10 by the pump P1 is preferably controlled by monitoring values measured by the measuring unit 11 such that the pressure in the airtight container 10 after the sending of the pressurization water is 130 to 160% of that before the sending of the pressurization water. This control allows the liquid delivery amount of the pressurization water toward the second reservoir 40 to be about one third of the volume of gas introduced into the airtight container 10. As a result, the airtight container can be appropriately pressurized without direct injection of the pressurization water into the airtight container.

The third pipe 60, which is for introducing residual gas into the airtight container 10 from the container B to be tested, is connected to the second pipe 50 at a connection portion J1 between the airtight container 10 and the pump P1. The third pipe 60 is provided with a valve V3 at an end portion thereof to which the container B to be tested is attached, and a valve V2 that is a three-way valve between the valve V3 and the connection portion J1. The charging pipe 21 is connected to a connection portion J2 between the valve V2 and the valve V3.

The calculating unit 70 is for calculating the volume of residual gas introduced into the container B to be tested according to Boyle's law, based on the liquid delivery amount of the pressurization water sent toward the airtight container 10 by the pump P1, i.e., a change in the volume of residual gas in the airtight container 10 due to pressurization, and pressures in the airtight container 10 measured by the measuring unit 11 before and after pressurization. The calculating unit 70 may be configured to carry out a function by a CPU of a computer or the like reading and executing a program stored in a memory. Specifically, the calculating unit 70 calculates the volume V of residual gas by expression (1) below, where v01 represents the liquid delivery amount of the pressurization water sent toward the airtight container 10 by the pump P1, p01 represents pressure in the airtight container 10 before pressurization, and p02 represents pressure in the airtight container 10 after pressurization.

$$V = \frac{p01+1}{p02-p01} \times v01 \times (p02+1) \quad (1)$$

The vibrating unit 80 includes a holder that holds the container B to be tested, and a motor that vibrates the holder, and the like. The vibrating unit 80 is for driving the motor to vibrate the container B to be tested and thereby produce gas bubbles, which are in turn introduced into the airtight container 10 by pressure in the container B to be tested.

The controlling unit 90, which is a computer having a CPU, a memory, a storage, and the like, controls the above components by the CPU reading and executing a program stored in the memory.

<Residual Gas Volume Measuring Method>

Figure 3:
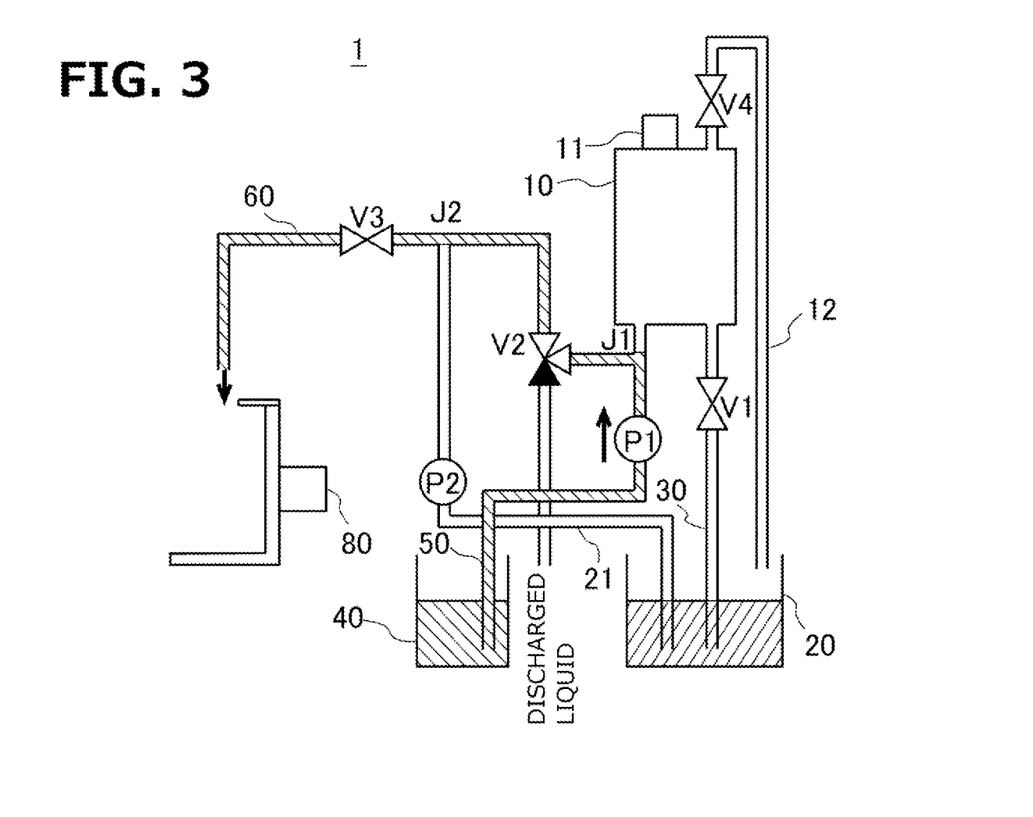
FIG. 3 is a diagram for describing a procedure of charging pressurization water into a pipe before execution of a residual gas volume measuring method.
Figure 4:
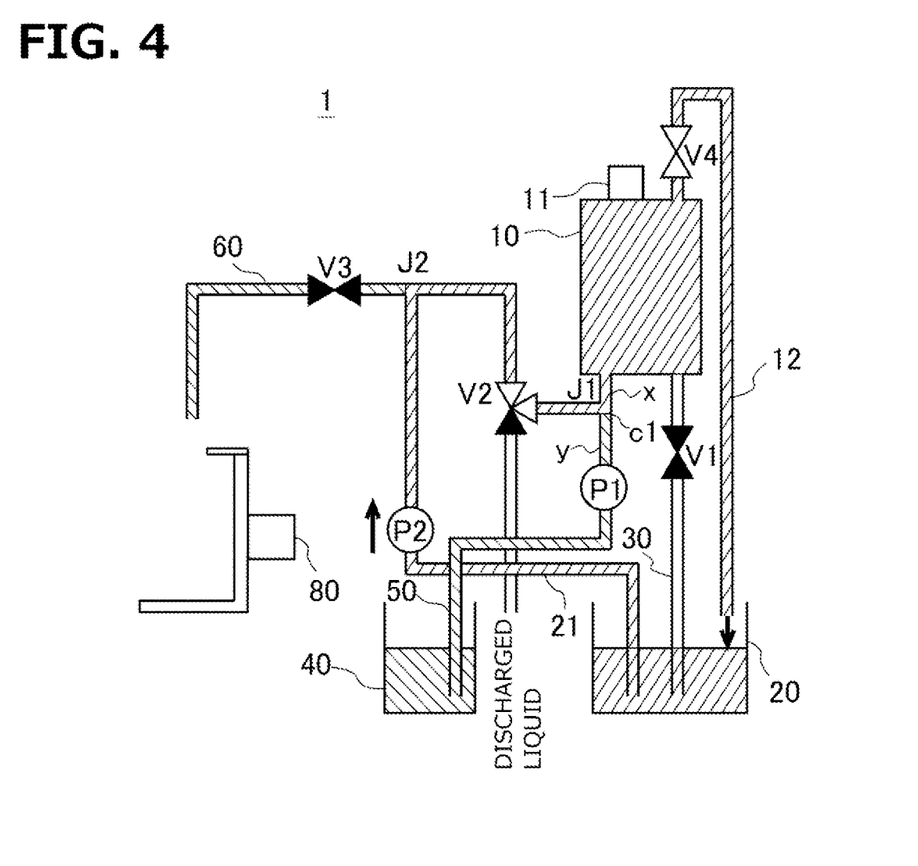
FIG. 4 is a diagram for describing a procedure of charging a carbon dioxide absorbing liquid into an airtight container and a pipe before execution of a residual gas volume measuring method.
Figure 5:
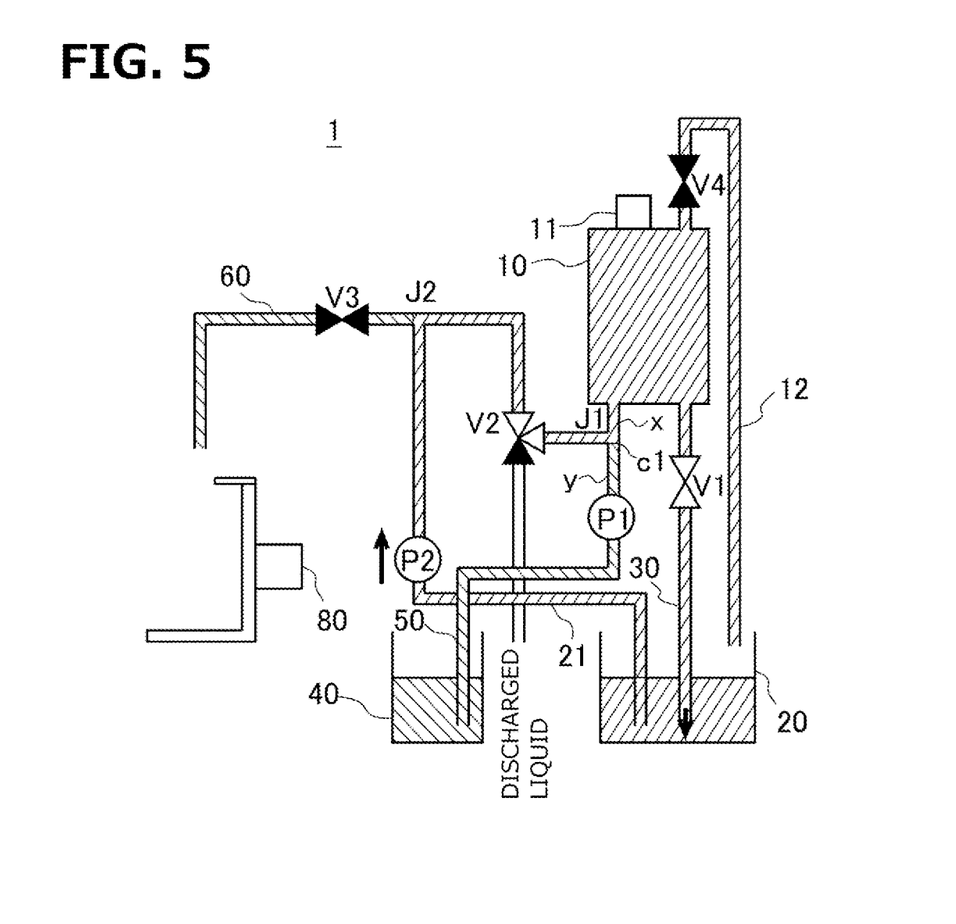
FIG. 5 is a diagram for describing a procedure of charging a carbon dioxide absorbing liquid into an airtight container and a pipe before execution of a residual gas volume measuring method.

A residual gas volume measuring method that is executed in the residual gas volume measuring device 1 will be described. Before execution of the residual gas volume measuring method, the airtight container 10 and pipes of the residual gas volume measuring device 1 are filled with the carbon dioxide absorbing liquid and the pressurization water. Specifically, as illustrated in FIG. 3, initially, in an operation of charging the pressurization water, the valve V2 is opened so that the connection portion J1 and the connection portion J2 are in communication with each other. The pump P1 is driven to send the pressurization water toward the airtight container 10 with the valve V3 open, so that the section of the second pipe 50 between the connection portion J1 and the second reservoir 40, and the third pipe 60, are filled with the pressurization water. Next, as illustrated in FIG. 4, in an operation of charging the carbon dioxide absorbing liquid, the valves V1 and V3 are closed, and the valve V2 is opened so that the connection portion J1 and the connection portion J2 are in communication with each other, and the pump P2 is driven to send the carbon dioxide absorbing liquid toward the connection portion J1 with the valve V4 open, so that the charging pipe 21, the section of the third pipe 60 between the connection portion J2 and the connection portion J1, the section of the second pipe 50 between the connection portion J1 and the airtight container 10, the airtight container 10, and the air draining pipe 12 are filled with the carbon dioxide absorbing liquid. Following this, as illustrated in FIG. 5, the valve V4 is closed and the valve V1 is opened with the pump P2 being driven, so that the first pipe 30 is filled with the carbon dioxide absorbing liquid. Here, in the operation of charging the carbon dioxide absorbing liquid as illustrated in FIG. 4, the pressurization water charged in the section of the third pipe 60 between the connection portion J2 and the connection portion J1 is replaced with the carbon dioxide absorbing liquid, so that in the second pipe 50, a liquid contact face c1 between the carbon dioxide absorbing liquid and the pressurization water is produced immediately below the connection portion J1. A section x that is closer to the airtight container 10 than is the liquid contact face c1 is filled with the carbon dioxide absorbing liquid, and a section y that is closer to the pump P1 than is the liquid contact face c1 is filled with the pressurization water.

Figure 2:
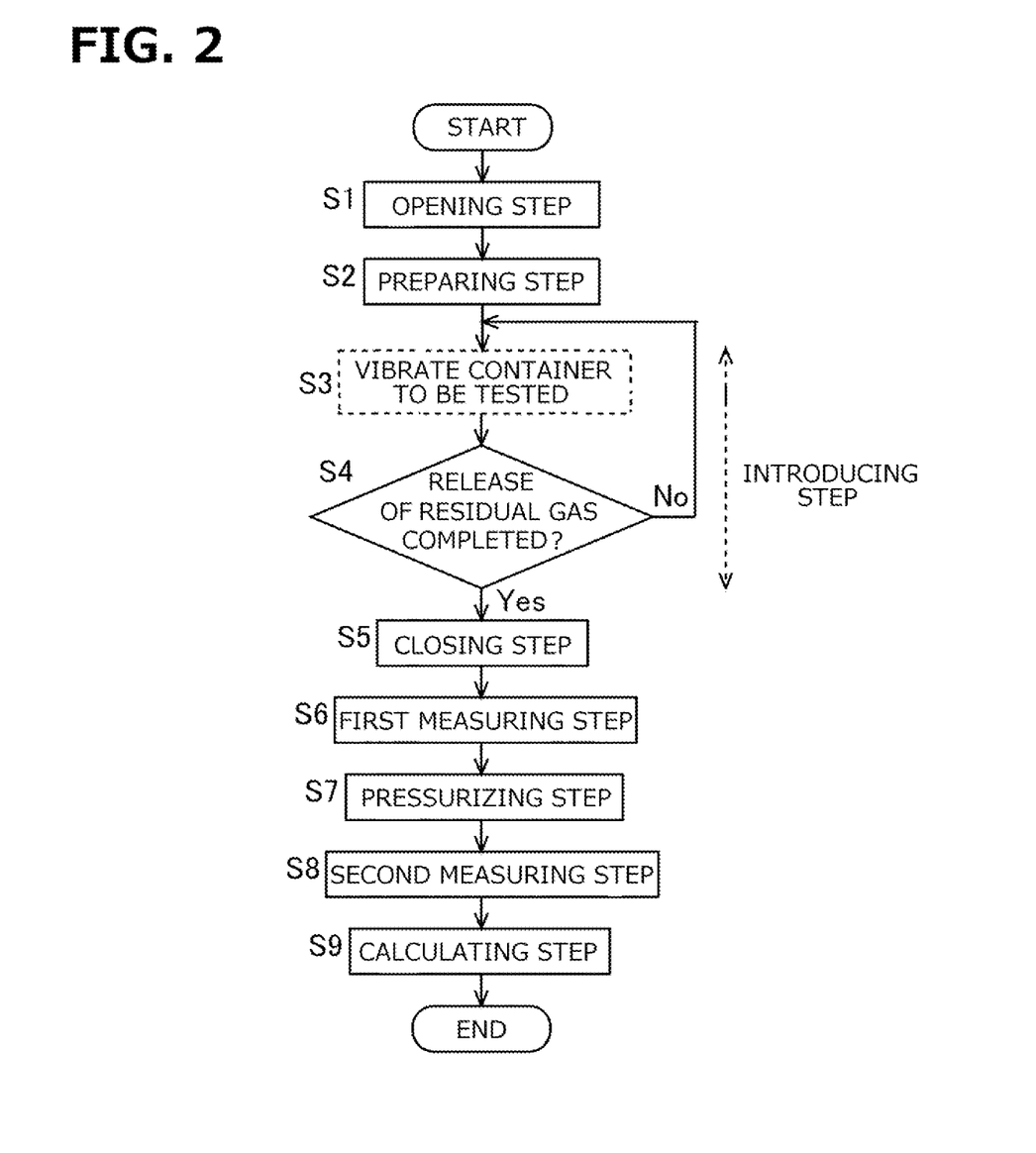
FIG. 2 is a flowchart of a residual gas volume measuring method according to the present invention.

FIG. 2 is a flowchart of a residual gas volume measuring method according to the present invention. In the residual gas volume measuring method, an opening step (S1), a preparing step (S2), an introducing step (S3 and S4), a closing step (S5), a first measuring step (S6), a pressurizing step (S7), a second measuring step (S8), and a calculating step (S9) are sequentially executed.

Figure 6:
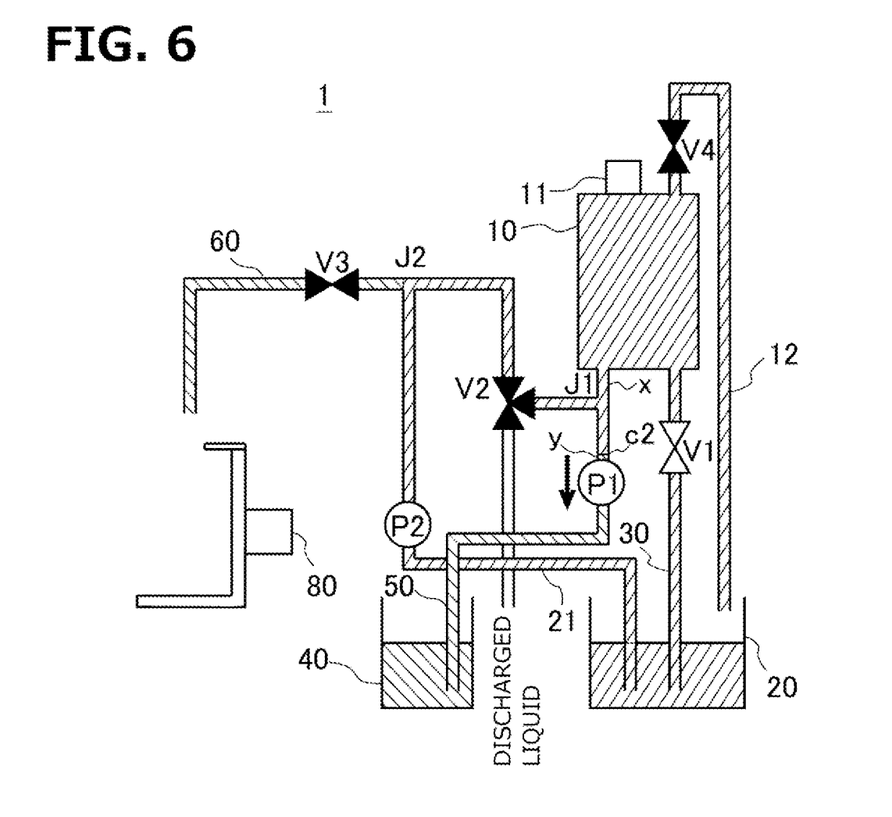
FIG. 6 is a diagram for describing a preparing step in a residual gas volume measuring method.

Initially, as illustrated in FIG. 5, in the opening step (S1), the valve V1 provided in the first pipe 30 is opened. In this state, the preparing step (S2) is executed. FIG. 6 is a diagram for describing the preparing step (S2). In the preparing step (S2), the valves V2 to V4 are closed, and the pump P1 is driven to send the pressurization water toward the second reservoir 40, so that a liquid contact face c2 is moved from a position immediately below the connection portion J1 to a position near the pump P1 in the second pipe 50. As a result, the second pipe 50 more effectively performs the buffering function of preventing the pressurization water sent toward the airtight container 10 by the pump P1 from flowing into the airtight container 10 in the pressurizing step described below.

Figure 7:
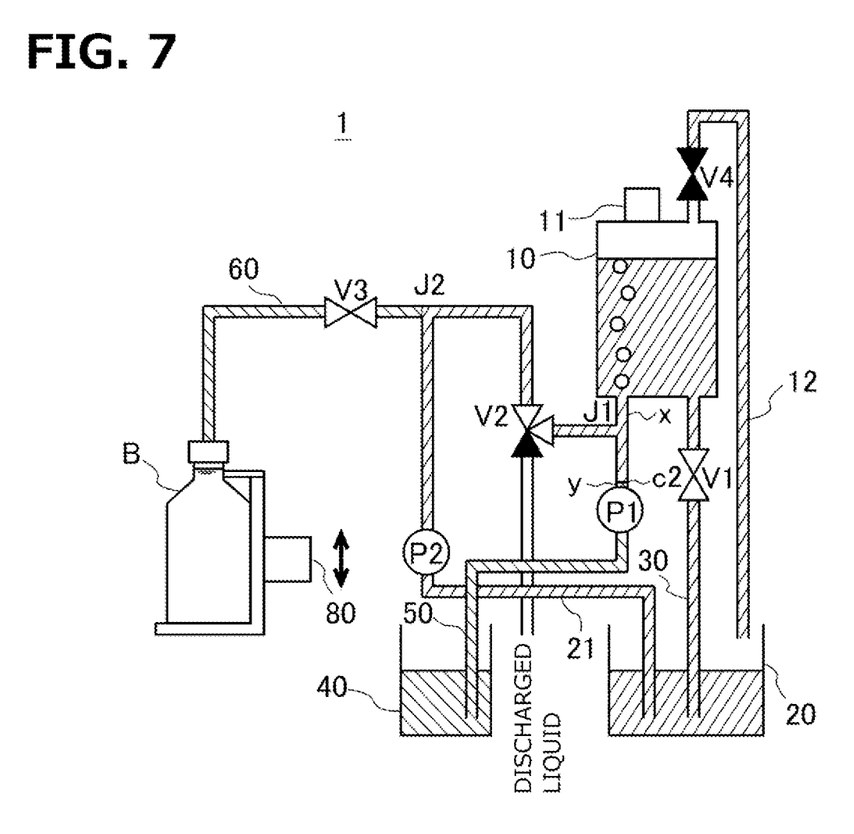
FIG. 7 is a diagram for describing an introducing step in a residual gas volume measuring method.

FIG. 7 is a diagram for describing the introducing step (S3 and S4). In the introducing step, after the container B to be tested is attached to a holder of the vibrating unit 80, the valve V3 provided in the third pipe 60 is opened, the valve V2 is opened so that the connection portion J1 and the connection portion J2 are in communication with each other, and the vibrating unit 80 vibrates the container B to be tested (S3). As a result, gas bubbles produced in the container B to be tested are introduced into the airtight container 10 by pressure in the container B to be tested. It should be noted that the vibration (S3) of the container B to be tested that is produced by the vibrating unit 80 is optional, $$V = \frac{p01 + 1}{p02 - p01} \times v01 \times (p02 + 1) \quad (1)$$

and may be removed if the gas is smoothly introduced into the airtight container 10. Residual gas introduced into the airtight container 10 is accumulated as a gas layer at an upper end portion of the airtight container 10. In the introducing step, whether or not the release of gas from the container B to be tested has come to an end is monitored (S4). In the monitoring of the release of gas, for example, the state of a gas flow in the third pipe 60 is monitored using an optical sensor or the like. If, when the flow of gas is replaced by the flow of liquid, a decrease in the intensity of light transmitted through the third pipe 60 is detected (S4: Yes), a decrease signal indicating the result of the detection is transmitted to the controlling unit 90.

Figure 8:
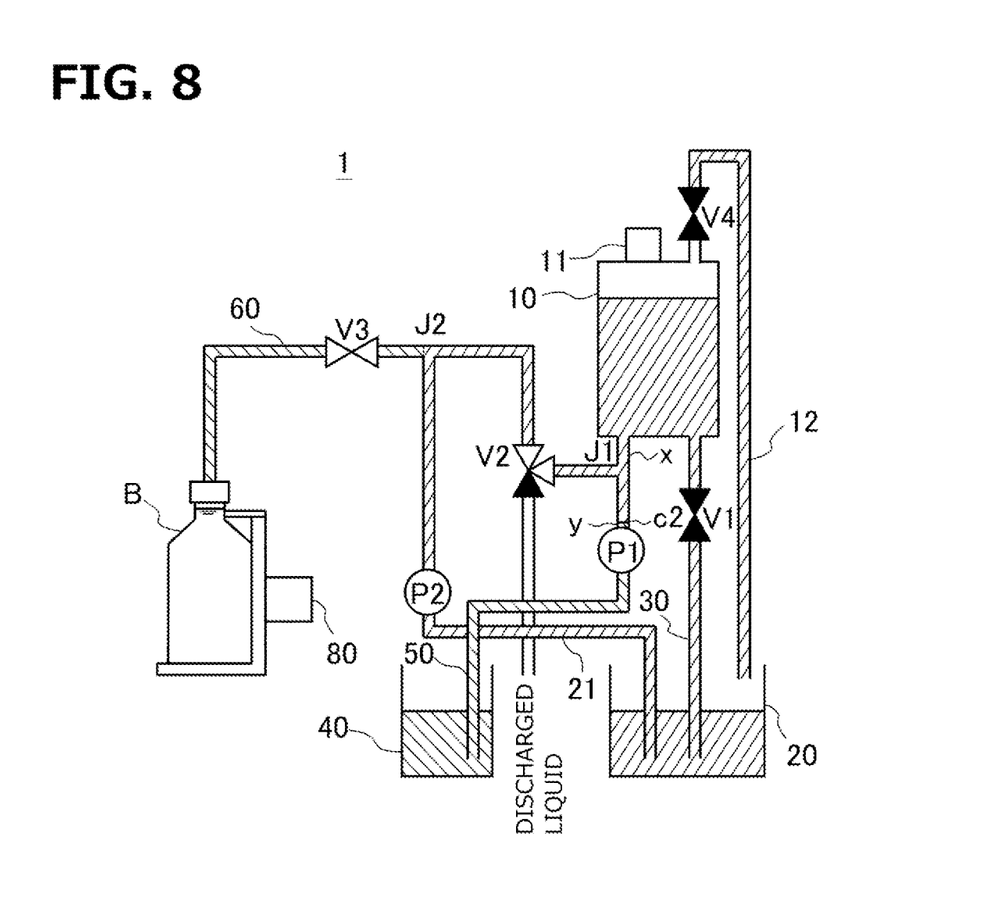
FIG. 8 is a diagram for describing a closing step and a first measuring step in a residual gas volume measuring method.

FIG. 8 is a diagram for describing the closing step (S5) and the first measuring step (S6). The closing step (S5) is executed after the controlling unit 90 receives the decrease signal indicating the end of the release of residual gas from the container B to be tested. In the closing step (S5), the valve V1 is closed. In the first measuring step (S6), which is executed in that state, the measuring unit 11 measures the pressure $p01$ of the gas layer in the airtight container 10. The measured pressure $p01$ is stored in the memory, storage, or the like of the residual gas volume measuring device 1, and is used in calculation of the volume of residual gas in the calculating step (S9) described below.

Figure 9:
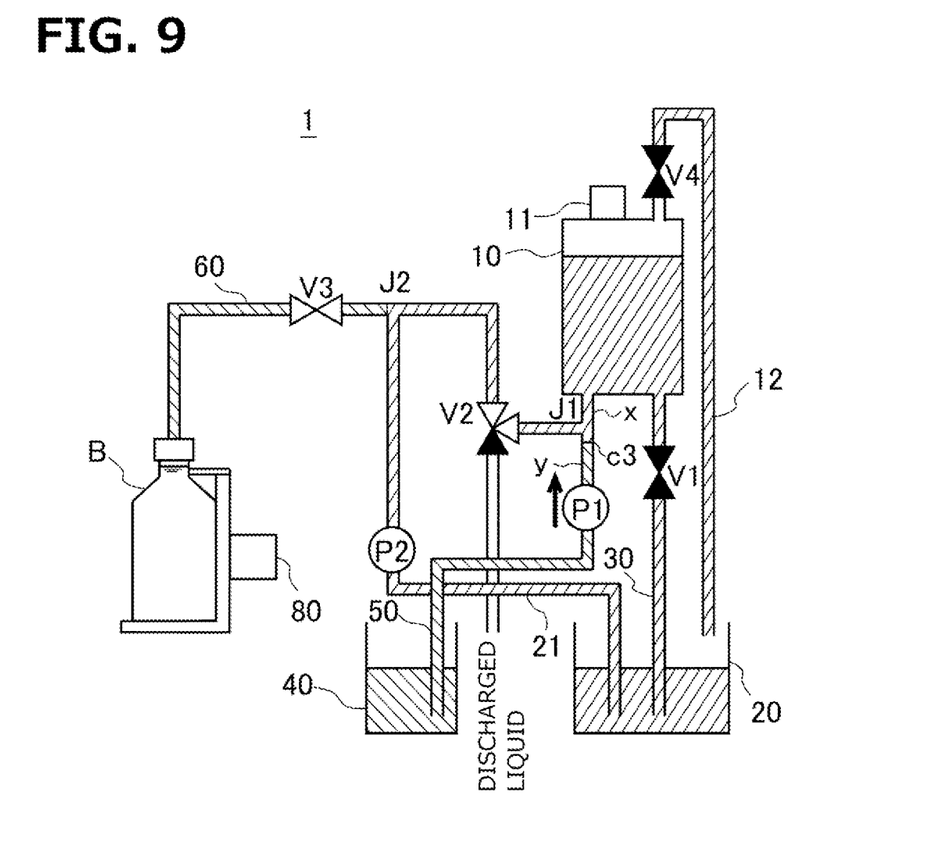
FIG. 9 is a diagram for describing a pressurizing step in a residual gas volume measuring method.

FIG. 9 is a diagram for describing the pressurizing step (S7). In the pressurizing step (S7), the pump P1 is driven to send the pressurization water toward the airtight container 10, and thereby pressurizes the airtight container 10. The liquid delivery amount $v01$ of the pump P1 in the pressurizing step (S7) is preferably smaller than the capacity of the section of the second pipe 50 between the pump P1 and the airtight container 10, and is more preferably smaller than the capacity of the section of the second pipe 50 between the pump P1 and the connection portion J1. If the liquid delivery amount $v01$ is smaller than the capacity of the section of the second pipe 50 between the pump P1 and the airtight container 10, the pressurization water does not flow into the airtight container 10, and a change in the partial molar volume of the pressurization water due to mixing is very small, and therefore, the volume of residual gas can be highly accurately measured. If the liquid delivery amount $v01$ is smaller than the capacity of the section of the second pipe 50 between the pump P1 and the connection portion J1, a liquid contact face c3 in the second pipe 50 is located closer to the pump P1 than to the connection portion J1, and therefore, the sent pressurization water does not flow into the third pipe 60. Therefore, the liquid contact area between the pressurization water and the carbon dioxide absorbing liquid can be further reduced, and therefore, the volume of residual gas can be more highly accurately measured. It should be noted that if the liquid delivery amount $v01$ is greater than the capacity of the section of the second pipe 50 between the pump P1 and the airtight container 10, the sent pressurization water flows into the airtight container 10. Nevertheless, the buffering function of the second pipe 50 has been enhanced because of the previous execution of the preparing step (S2), and therefore, the amount of the pressurization water flowing into the airtight container 10 is only a very small portion of the liquid delivery amount $v01$. Therefore, even when the liquid delivery amount $v01$ is greater than the capacity of the section of the second pipe 50 between the pump P1 and the airtight container 10, a change in the partial molar volume of the pressurization water due to mixing in the airtight container 10 is not significant, and therefore, the volume of residual gas can be measured with practical accuracy. The liquid delivery amount $v01$ in the pressurizing step (S7) is stored in the memory, storage, or the like of the residual gas volume measuring device 1, and is used in calculation of the volume of residual gas in the calculating step (S9) described below. When the container B to be tested is replaced with another container to be tested and the residual gas volume measuring method is repeated, the liquid delivery amount $v01$ stored in the memory, storage, or the like of the residual gas volume measuring device 1 may be used to determine the liquid delivery amount of the pump P1 in the preparing step (S2), in measurement of the next container B to be tested. For example, if the liquid delivery amount $v01$ obtained in measurement of residual gas for the first container B to be tested is smaller than the capacity of the section of the second pipe 50 between the pump P1 and the airtight container 10, that liquid delivery amount $v01$ can be used as a liquid delivery amount in the preparing step (S2) in measurement of the next container B to be tested.

The second measuring step (S8) is executed after the end of the driving of the pump P1 in the pressurizing step (S7). In the second measuring step (S8), the pressure $p02$ of the gas layer in the airtight container 10 pressurized by the sending of the liquid by the pump P1 in the pressurizing step (S7) is measured by the measuring unit 11. The measured pressure $p02$ is stored in the memory, storage, or the like of the residual gas volume measuring device 1, and is used in calculation of the volume of residual gas in the calculating step (S9) described below.

In the calculating step (S9), the calculating unit 70 calculates the volume V of residual gas according to expression (1), based on the liquid delivery amount $v01$, the pressure $p01$ in the airtight container 10 before pressurization, and the pressure $p02$ in the airtight container 10 after pressurization, which are stored in the memory, storage, or the like of the residual gas volume measuring device 1.

By the above procedure, the residual gas volume measuring method is completed. In the residual gas volume measuring device 1, by execution of the residual gas volume measuring method, the pump P1 can pressurize the airtight container 10 only by sending the pressurization water without being brought into contact with the carbon dioxide absorbing liquid. As a result, the pump P1 is not exposed to a strong base, and therefore, can be prevented from deteriorating. In addition, the long-term use of the pump 1 does not lead to deposition of a solute of the carbon dioxide absorbing liquid in the pump P1. Furthermore, the section of the second pipe 50 closer to the airtight container 10 is filled with the carbon dioxide absorbing liquid, and therefore, the pressurization water sent toward the airtight container 10 by the pump P1 is not directly injected into the airtight container 10, and most of the pressurization water remains in the second pipe 50. Therefore, a change in the partial molar volume of the pressurization water due to mixing with the carbon dioxide absorbing liquid is very small for the liquid delivery amount of the pump P1, and therefore, the volume of residual gas can be highly accurately measured.

INDUSTRIAL APPLICABILITY

The residual gas volume measuring device according to the present invention is useful for applications of measurement of the volume of residual gas in a container filled with carbonated drink, beer, low-malt beer, or the like.

REFERENCE SIGNS LIST

1 RESIDUAL GAS VOLUME MEASURING DEVICE
10 AIRTIGHT CONTAINER
11 MEASURING UNIT
20 FIRST RESERVOIR
30 FIRST PIPE
40 SECOND RESERVOIR
50 SECOND PIPE
60 THIRD PIPE
P1 PUMP
V1 VALVE

The invention claimed is:

1. A residual gas volume measuring device for measuring the volume of residual gas in a container to be tested, comprising:
   an airtight container that is filled with a basic carbon dioxide absorbing liquid;
   a first reservoir in which the carbon dioxide absorbing liquid is retained;
   a first pipe through which the airtight container and the first reservoir are in communication with each other and that is filled with the carbon dioxide absorbing liquid;
   a valve that is provided in the first pipe;
   a second reservoir in which pressurization water is retained;
   a second pipe through which the airtight container and the second reservoir are in communication with each other, a section closer to the airtight container of which is filled with the carbon dioxide absorbing liquid, and a section closer to the second reservoir of which is filled with the pressurization water; and
   a pump that is provided in the section of the second pipe that is filled with the pressurization water, wherein
   before the residual gas is introduced from the container to be tested into the airtight container, the pump sends the pressurization water in the second pipe toward the second reservoir with the valve open, and after the residual gas is introduced from the container to be tested into the airtight container, the pump sends the pressurization water in the second pipe toward the airtight container with the valve closed.

2. The residual gas volume measuring device according to claim 1, further comprising:
   a measuring unit that measures pressure in the airtight container,
   wherein
   after the residual gas is introduced from the container to be tested to the airtight container, the pump sends the pressurization water in the second pipe toward the airtight container until a measured value obtained by the measuring unit reaches a predetermined pressure.

3. The residual gas volume measuring device according to claim 1, wherein
   a liquid delivery amount of the pressurization water in the second pipe that is sent toward the airtight container by the pump after the residual gas is introduced from the container to be tested into the airtight container is smaller than the capacity of a section of the second pipe between the airtight container and the pump.

4. The residual gas volume measuring device according to claim 1, wherein
   the capacity of a section of the second pipe between the airtight container and the pump is 1 to 5 mL.

5. The residual gas volume measuring device according to claim 1, wherein
   the second pipe is connected to a third pipe at a position between the airtight container and the pump, the third pipe being in communication with the container to be tested, and
   a liquid delivery amount of the pressurization water in the second pipe that is sent toward the airtight container by the pump after the residual gas is introduced from the container to be tested into the airtight container is smaller than the capacity of a section of the second pipe between the pump and the connection position to the third pipe.

6. The residual gas volume measuring device according to claim 1, wherein
   a liquid delivery amount of the pressurization water in the second pipe that is sent toward the airtight container by the pump after the residual gas is introduced from the container to be tested into the airtight container is controlled such that pressure in the airtight container after the sending of the pressurization water in the second pipe is 130 to 160% of the pressure before the sending of the pressurization water in the second pipe.

7. A residual gas volume measuring method for introducing residual gas in a container to be tested into an airtight container filled with a basic carbon dioxide absorbing liquid and measuring the volume of the residual gas, comprising:
   an opening step of opening a valve provided in a first pipe through which a first reservoir retaining the carbon dioxide absorbing liquid and the airtight container are in communication with each other and that is filled with the carbon dioxide absorbing liquid;
   a preparing step of sending pressurization water retained in a second pipe through which a second reservoir retaining the pressurization water and the airtight container are in communication with each other, a section closer to the airtight container of which is filled with the carbon dioxide absorbing liquid, and a section closer to the second reservoir of which is filled with the pressurization water, toward the second reservoir, using a pump provided in the section of the second pipe that is filled with the pressurization water;
   an introducing step of introducing the residual gas from the container to be tested into the airtight container;
   a closing step of closing the valve;
   a first measuring step of measuring pressure in the airtight container;

a pressurizing step of sending the pressurization water in the second pipe toward the second reservoir using the pump;

a second measuring step of, after the end of the sending of the pressurization water in the second pipe in the pressurizing step, measuring pressure in the airtight container; and a calculating step of calculating the volume of the residual gas, based on the pressure measured in the first measuring step and the pressure measured in the second measuring step.

\* \* \* \* \*